(12) United States Patent (10) Patent No.: US 7,457,115 B2
Farrow (45) Date of Patent: Nov. 25, 2008

(54) FLUID IMPELLING DEVICE AND ELECTRONIC APPARATUS

(75) Inventor: Timothy Samuel Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/608,284

(22) Filed: Dec. 8, 2006

(65) Prior Publication Data

US 2008/0137288 A1 Jun. 12, 2008

(51) Int. Cl.
*H05K 7/20* (2006.01)
*F04C 3/00* (2006.01)

(52) U.S. Cl. ............... 361/694; 361/695; 361/690; 418/35; 418/68

(58) Field of Classification Search ......... 361/689–690, 361/694–695; 165/80.3, 104.33, 121–122; 418/35, 38, 68, 195–196; 454/184; 415/1, 415/90
See application file for complete search history.

(56) References Cited

U.S. PATENT DOCUMENTS 3,277,792 A * 10/1966 Stenerson ............... 418/193
3,973,469 A * 8/1976 Humen .................. 91/51
5,171,142 A * 12/1992 Proglyada ............... 418/68
6,941,900 B1 * 9/2005 Malinov ................ 123/18 R

FOREIGN PATENT DOCUMENTS

DE 1528587 B * 1/1976
DE 19616125 A1 * 10/1997
JP 2002061586 A * 2/2002

* cited by examiner

*Primary Examiner*—Anatoly Vortman
(74) *Attorney, Agent, or Firm*—Katharyn E. Owen; Driggs, Hogg, Daugherty & Del Zoppo Co., LPA

(57) ABSTRACT

A new type of device, useful as a fan among other applications, in which fluid flow is induced by providing within the device a chamber of constantly increasing volume and a chamber of constantly decreasing volume. Fluid moves through these chambers impelled by the rotation of a pair of members linked together for rotation about skewed axes. The members move within a chamber having a spherical surface, into which open ports for inward and outward fluid flow. The device may be used to assist in cooling components of an electronic system such as a computer system.

17 Claims, 4 Drawing Sheets

FLUID IMPELLING DEVICE AND ELECTRONIC APPARATUS

FIELD AND BACKGROUND OF INVENTION

This invention relates to a fluid impelling device and to electronic apparatus.

It is well known to induce a flow of a fluid such as a liquid or gas by employing a mechanical device which impels such flow. For fluids which are liquid, such devices are commonly known as pumps. For fluids which are gases, such as air, such devices are variously known as fans or compressors, depending in part on the degree to which the pressure of the gas is raised by operation of the device. Particularly as to devices which fall into the category of fans, two particular forms are in wide use: the radial blade fan and the scroll or squirrel cage fan.

Radial blade fans are widely used to move air in homes, sometimes as overhead fans. As employed in smaller sizes to provide a flow of cooling air for devices such as electronic apparatus, such fans usually have a support for the rotating blade element which in is the form of a spider frame. Such spider frames are disposed in the airflow generated by the rotating radial blades and, when the fan operates at a significant rotational speed, cause a "siren" effect due to the passage of the blades past the spider frame. The noise so generated has become problematical in electronic devices or systems intended for use in quiet locations such as a home or office. That noise has been a problem with computer systems.

Scroll or squirrel cage fans may be designed to operate somewhat more quietly. However, such fans deliver lower air flows from a greater volume of occupied space, and thus are a poor design choice for confined areas such as the housings of electronic systems. Thus the class of fans has been little used and is generally deemed unacceptable in such applications.

With the foregoing in mind, there is a need for an alternative device for impelling fluid flow, and in particular for the application of such a device to providing a cooling air flow for electronic systems such as computer systems of the desktop or notebook types.

SUMMARY OF THE INVENTION

One purpose of this invention is to provide an innovative device for impelling fluid flow. In realizing this purpose, a new type of device, useful as a fan among other applications, is proposed in which fluid flow is induced by providing within the device a chamber of constantly increasing volume and a chamber of constantly decreasing volume. Fluid moves through these chambers impelled by the rotation of a pair of members linked together for rotation about skewed axes. The members move within a chamber having a spherical surface, into which open ports for inward and outward fluid flow.

Another purpose of this invention is to employ a device of the innovative type just described to assist in cooling components of an electronic system such as a computer system. In realizing this purpose, the device with the paired disk-like members is arranged to induce a flow of air which is applied to cooling elements of the system such as central processor units.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
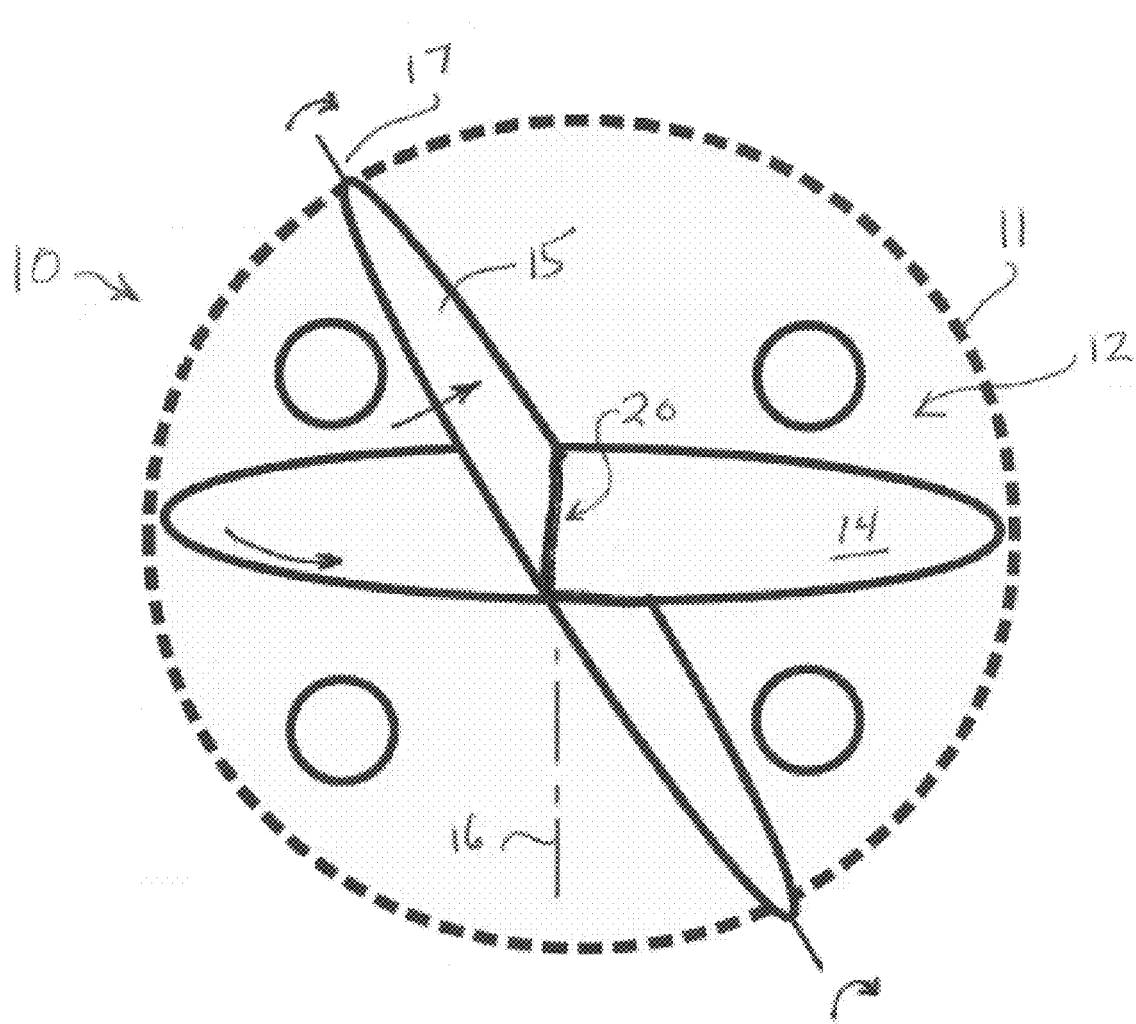
FIG. 1 is a schematic representation of the fluid impelling device of this invention.

Referring now more particularly to FIG. 1, the representation given there is simplified in an effort to clarify the relationships among the elements of the flow impelling device. The point of view of the drawing will become more clear from the discussion which follows. The device, indicated at 10, has a housing shown in phantom lines at 11 which defines a chamber 12 having a spherical surface. As shown, the surface is a full sphere. It is contemplated that the invention will function with a half spherical surface. Mounted within the housing 11 are a first planar disk-like member 14 and a second planar disk-like member 15. The point of view from which the figure is taken is a perspective view of the plane in which the first member 14 lies to permit a clarifying view of the elements. Where a hemispherical surface is used, the second member 15 will be a semicircular or half disk member rather than a full disk.

As illustrated, each of the members 14, 15 is mounted within the housing 11 to divide the volume of the chamber 12 into hemispheres. Each of the members 14, 15 lies along a diameter of the spherical chamber, such that the edges describe a great circle within the spherical chamber. Each of the members 14, 15 is mounted within the housing for rotation relative thereto on a respective axis 16, 17. These axes are skewed one relative to the other.

In accordance with important characteristics of this invention, the axes on which the members 14, 15 rotate define a plane which intersects perpendicularly to the plane of said first rotatable member (FIG. 1). Additionally, the axis about which the second member 15 rotates is a diameter of the spherical chamber which is skewed relative to the plane of the first member 14 and to the axis about which the first member rotates. At the intersection of the members, an axis 20 is defined about which the second member 15 oscillates relative to the first member 14. The axis 20 is perpendicular to the plane defined by the two skewed axes 16, 17.

As a result of these interconnections, rotation of the members about their respective axes and the cooperation between them defines with the hemispheric chambers a volume which is constantly expanding and a second volume which is constantly contracting. The constantly expanding volume is open to the inlet port, while the constantly contracting volume is open to the discharge port. Thus a flow of fluid is drawn in through the inlet port and impelled through the outlet port.

The intake operation occurs while a quarter circular portion of the second member is moving away from the inlet port. The output operation occurs while a quarter circular portion of the second member is moving toward the outlet port. As the second member rotates about the axis 17, each quarter circle portion functions first to draw fluid into the chamber and then to expel fluid from the chamber as those portions move past the ports. No valving is necessary at the ports, the equivalent of valving being provided by the rotation of the second member 15.

While the device described thus far will impel a flow of fluid through one hemisphere, the preferred embodiment uses both hemispheres defined within the spherical chamber. To that end, the embodiment illustrated here has a second set of ports communicating with a lower hemisphere within a fully spherical chamber. In such an embodiment, the flow rates are increased by full utilization of fully disk-like members.

The members 14, 15 may be driven in rotation by engagement of an appropriate drive mechanism either to the axis about which the second member 15 rotates or about the periphery of the first member 14. The drive mechanism is not here shown as it is believed to be within the skill of a competent mechanical designer who has an understanding of the mechanism here shown and described.

Figure 2:
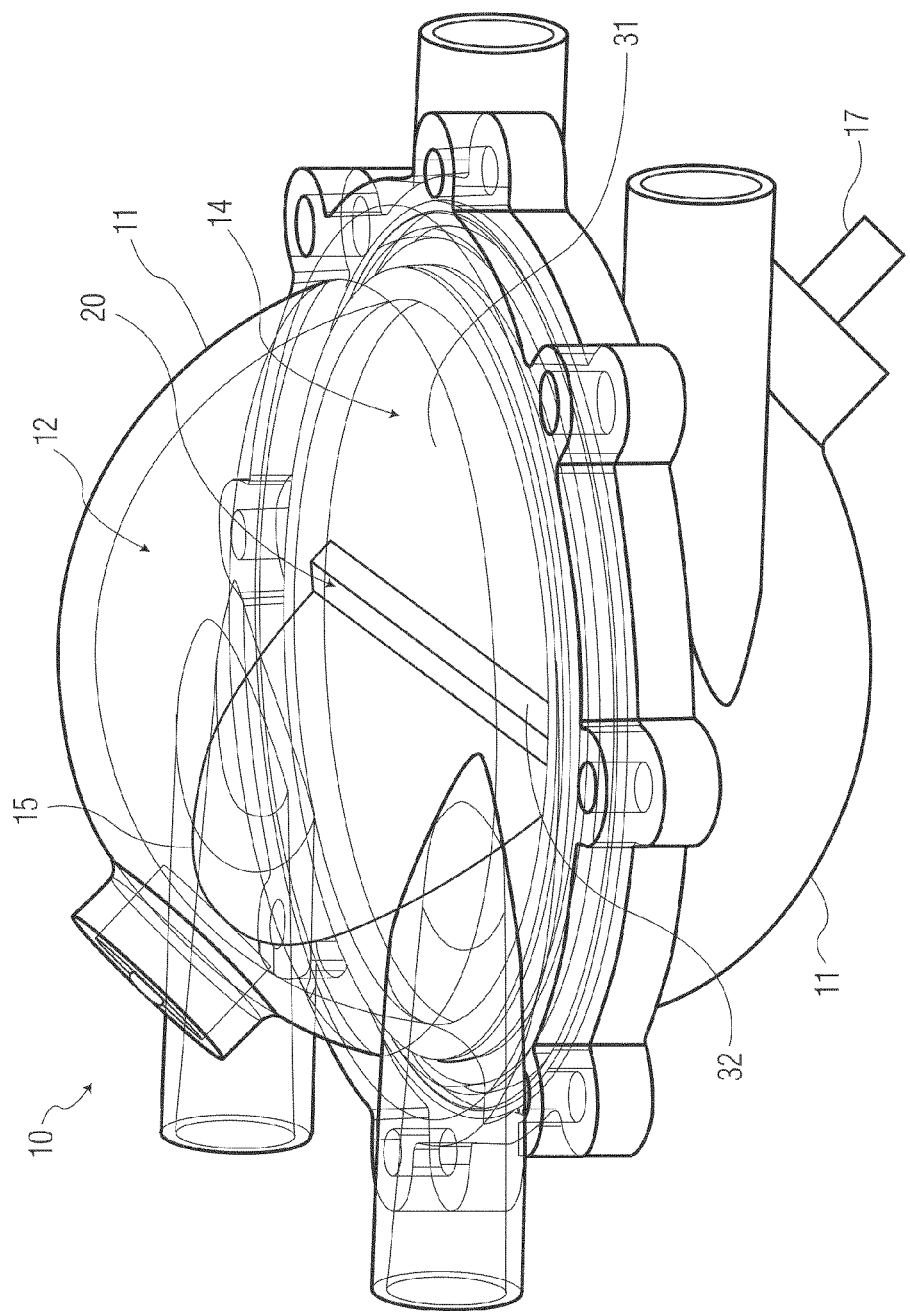
FIG. 2 is a perspective view of one implementation of this invention, with one hemisphere of the device in phantom lines to permit viewing the disk like members included in the device.
Figure 3:
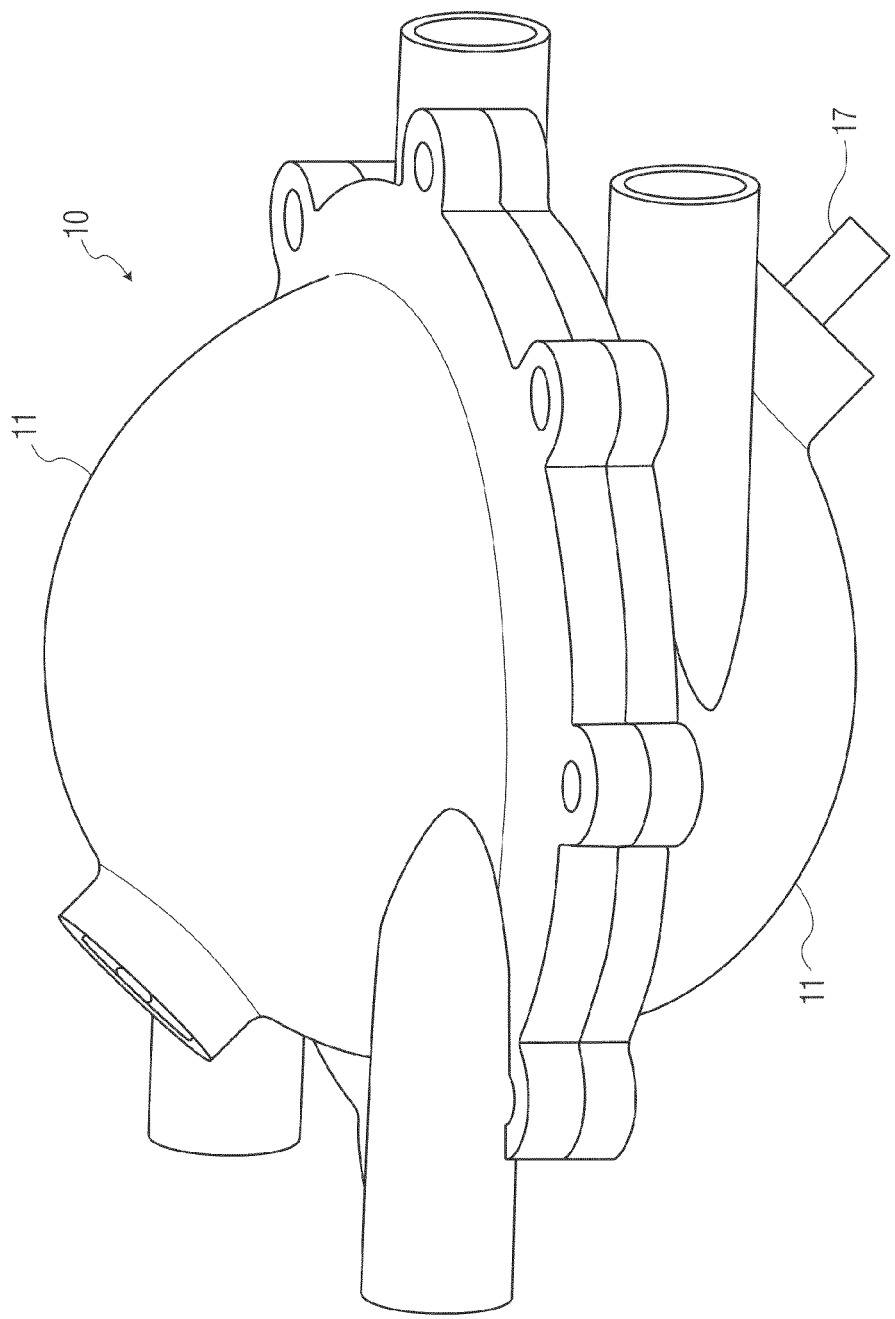
FIG. 3 is a view similar to FIG. 2, showing the assembled implementation of this invention.

Referring now to FIGS. 2 and 3, what is there shown is an illustrative embodiment implementing the invention. In FIG. 2, the upper portion of a two part housing is shown in phantom lines in order to make visible the rotating members. In FIG. 3, the housing is shown in full illustration, with the rotating members shielded from view.

Figure 4:
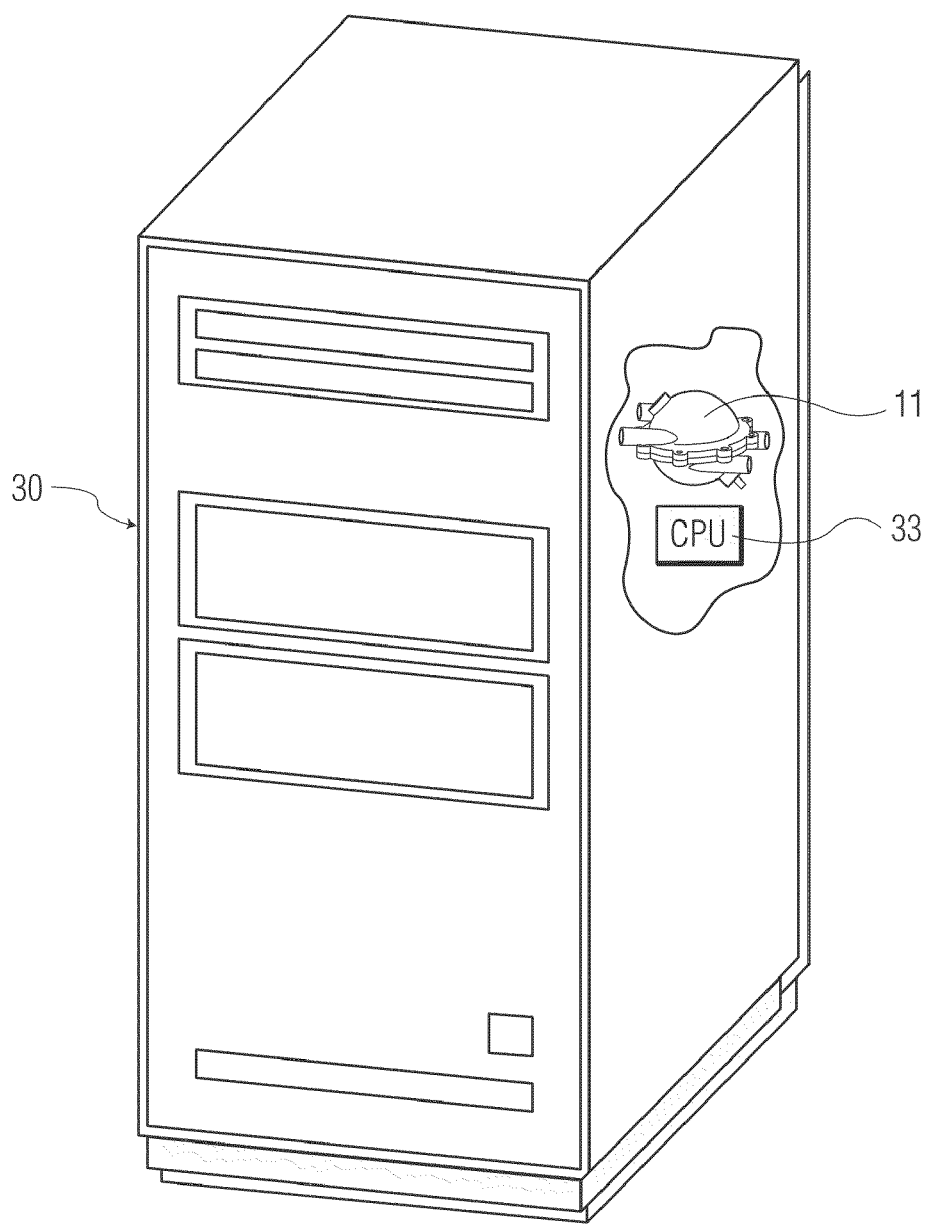
FIG. 4 is perspective view of an electronic apparatus in which the device of FIGS. 1 through 3 is used to impel a flow of cooling air.

In operation, as one of the members 14, 15 is driven in rotation, the second member defines with the chamber a volume which is constantly expanding and a volume which is constantly contracting. The ports are coupled to the volumes for fluid flow to said volumes, and a flow of fluid through the chamber is impelled by the rotation of the disk-like member. Where the fluid is a gas and particularly air, the air flow can be directed for cooling of some element which becomes hot. An application is illustrated in FIG. 4, where a housing 30 for a personal computer system is shown. The housing 11 of the device of FIGS. 1 through 3 is mounted within the electronic system housing 30 and the ports arranged to direct an impelled flow of air across an element which heats up during use, such as the CPU.

In such operation, the rates of acceleration and deceleration of the first and second members during rotation do not exactly match, due to the skew between the axes as mentioned above. This skew angle is an important characteristics of the invention, and selection of the skew angle with affect the volumetric efficiency of the device. In order to accommodate the variations in rotational acceleration and deceleration, the implementation shown in FIGS. 2 and 3 has an additional feature. There, the axis 20 about which the second member 15 oscillates is provided on a secondary member mounted with, and free to move relative to, the main body of the first member 14. In particular, the first rotatable member 14 comprises a primary component 31 defining a major portion of the disk-like configuration and a secondary component 32 defining a minor portion of said disk-like configuration mounted within said major portion for oscillation relative thereto. The secondary component 32 couples the first and second rotatable members together, allowing relative movement between the major and minor portions to dampen acceleration and deceleration of the first rotatable member relative to the second rotatable member.

In the drawings and specifications there have been set forth preferred embodiments of the invention and, although specific terms are used, the description thus given uses terminology in a generic and descriptive sense only and not for purposes of limitation.

What is claimed is:

1. An apparatus, comprising:
   a housing defining a chamber with a spherical surface, an inlet port opening through said housing into a hemisphere of said chamber, and an outlet port opening through said housing from the same hemisphere of said chamber;
   a planar, disk-like first rotatable member mounted within said housing for rotation relative thereto and positioned to bound the hemisphere within said chamber, the hemisphere communicating with said inlet port and said outlet port;
   a shaft extending through the chamber skewed relative to a plane of said first rotatable member; and
   a planar, disk-like second rotatable member mounted within said housing for movement relative to said housing and to said first rotatable member, said second rotatable member, including:
      a first half disk portion extending from a first side of said first rotatable member along said shaft, wherein the first half disk portion includes a first planar side; and
      a second half disk portion extending from a second opposing side of said first rotatable member along said shaft, wherein the second half disk portion includes a second planar side, and wherein the first and second planar sides face a same direction;
   said second rotatable member mounted in said housing for rotation about the shaft and coupled to said first rotatable member for oscillation about an axis lying in the plane of said first rotatable member;
   said rotatable members cooperating one with another and with said ports to define an expanding volume opening from said inlet port and a contracting volume opening to said outlet port;
   rotation of said first and second rotatable members inducing a flow of fluid through said ports and said chamber.

2. The apparatus according to claim 1 wherein said chamber defines a spherical volume.

3. The apparatus according to claim 2 wherein said first rotatable member bounds two hemispheres including the first and a second hemisphere within said chamber and further comprising said second hemisphere having a second inlet port and a second outlet port, said second ports opening into a hemisphere other than the hemisphere into which the first mentioned ports open.

4. The apparatus according to claim 1 wherein said axes about which said first and second rotatable members move define a plane which intersects perpendicularly to the plane of said first rotatable member.

5. The apparatus according to claim 1 wherein the axis about which said second rotatable member rotates extends along a radius of said spherical surface.

6. The apparatus according to claim 1 wherein the plane of said first rotatable member intersects said spherical chamber along a great circle thereof.

7. The apparatus according to claim 1 wherein said first rotatable member comprises a primary component defining a major portion of the disk-like configuration and a secondary component defining a minor portion of said disk-like configuration mounted within said major portion for oscillation relative thereto and coupling said first and second rotatable members together, relative movement between said major and minor portions dampening acceleration and deceleration of said first rotatable member relative to said second rotatable member.

8. The apparatus according to claim 1, wherein said first and second portions of said planar disk-like second rotatable member together form a circular disk.

9. An apparatus comprising:
a first housing enclosing a heat producing electronic system; and
a fluid flow inducing device coupled to said heat producing electronic system for impelling a cooling flow of fluid across said heat producing electronic system, said device comprising:
a second housing defining a chamber with a spherical surface, an inlet port opening through said second housing into a hemisphere of said chamber, and an outlet port opening through said second housing from the same hemisphere of said chamber;
a planar, disk-like first rotatable member mounted within said second housing for rotation relative thereto and positioned to bound the hemisphere within said chamber, the hemisphere communicating with said inlet port and said outlet port; and
a circular planar second rotatable member mounted within said second housing for movement relative to said second housing and to said first rotatable member, said second rotatable member mounted in said second housing for rotation about an axis skewed relative to the plane of said first rotatable member and coupled to said first rotatable member for oscillation about an axis lying in the plane of said first rotatable member;
said rotatable members cooperating one with another and with said ports to define an expanding volume opening from said inlet port and a contracting volume opening to said outlet port;
rotation of said first and second rotatable members inducing a flow of fluid through said ports and said spherical chamber.

10. The apparatus according to claim 9 wherein said axes about which said second rotatable member moves defines a plane which intersects perpendicularly to the plane of said first rotatable member.

11. The apparatus according to claim 9 wherein the axis about which said second rotatable member rotates extends along a diameter of of the hemisphere of said chamber.

12. The apparatus according to claim 9 wherein the plane of said first rotatable member intersects said spherical chamber along a great circle thereof.

13. The apparatus according to claim 9 wherein said first rotatable member comprises a primary component defining a major portion of the disk-like configuration and a secondary component defining a minor portion of said disk-like configuration mounted within said major portion for oscillation relative thereto and coupling said first and second rotatable members together, relative movement between said major and minor portions dampening acceleration and deceleration of said first rotatable member relative to said second rotatable member.

14. The apparatus according to claim 9 wherein said heat producing electronic system is a computer system.

15. The apparatus according to claim 9 wherein said chamber in said second housing defines a spherical volume.

16. The apparatus according to claim 15 wherein said first rotatable member bounds two hemispheres including the first and a second hemisphere within said chamber and further comprising said second hemisphere having a second inlet port and a second outlet port, said second ports opening into a hemisphere other than the hemisphere into which the first mentioned ports open.

17. The apparatus according to claim 9, wherein the circular planar second rotatable member includes a first half disk portion with a first planar side and a second half disk portion with a second planar side, wherein the first and second planar sides face a same direction.

* * * * *